United States Patent
Mineo (10) Patent No.: US 10,187,489 B2
(45) Date of Patent: Jan. 22, 2019

(54) INFORMATION PROCESSING DEVICE AND RECORDING MEDIUM

(71) Applicant: Sony Corporation, Tokyo (JP)

(72) Inventor: Yoshiyuki Mineo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 149 days.

(21) Appl. No.: 15/122,558

(22) PCT Filed: Jan. 15, 2015

(86) PCT No.: PCT/JP2015/050963
§ 371 (c)(1),
(2) Date: Aug. 30, 2016

(87) PCT Pub. No.: WO2015/151547
PCT Pub. Date: Oct. 8, 2015

(65) Prior Publication Data
US 2017/0070589 A1    Mar. 9, 2017

(30) Foreign Application Priority Data

Apr. 3, 2014   (JP) .................................. 2014-076888

(51) Int. Cl.
*H04L 12/24*    (2006.01)
*H04L 29/08*    (2006.01)
*G06F 17/30*    (2006.01)

(52) U.S. Cl.
CPC .... *H04L 67/2842* (2013.01); *G06F 17/30902* (2013.01); *H04L 67/2823* (2013.01)

(58) Field of Classification Search
CPC .......................... H04L 67/2842; H04L 67/2823
See application file for complete search history.

(56) References Cited

U.S. PATENT DOCUMENTS

| | | | |
|---|---|---|---|
| 2004/0049579 A1* | 3/2004 | Ims | H04L 67/2823 709/225 |
| 2004/0267908 A1 | 12/2004 | Doi et al. | |
| 2012/0030653 A1* | 2/2012 | Porras | G06F 8/4441 717/124 |
| 2012/0214446 A1* | 8/2012 | Soundrapandian | G06F 17/30442 455/412.1 |

(Continued)

FOREIGN PATENT DOCUMENTS

| | | | |
|---|---|---|---|
| EP | 1061458 A2 * | 12/2000 | G06F 17/30902 |
| JP | 2001-43125 A | 2/2001 | |
| JP | 2001-125820 A | 5/2001 | |

(Continued)

OTHER PUBLICATIONS

International Search Report dated Mar. 24, 2015 in PCT/JP2015/050963, filed Jan. 15, 2015.

*Primary Examiner* — Scott B Christensen
(74) *Attorney, Agent, or Firm* — Xsensus, LLP (57) ABSTRACT

[Object] To optimize a content output process by caching a source of content in an appropriate format.
[Solution] Provided is an information processing device including: a source acquisition unit configured to acquire a source of content; and a content output unit configured to output the content on the basis of the acquired source. The source includes a source cached by a client, and the cached source includes a source converted into an intermediate format.

10 Claims, 7 Drawing Sheets

(56) References Cited

U.S. PATENT DOCUMENTS

2013/0246944 A1\* 9/2013 Pandiyan ............ G06F 9/54
715/760

FOREIGN PATENT DOCUMENTS

| JP | 2002-304314 A | 10/2002 |
|----|---------------|---------|
| JP | 2005-20588 A | 1/2005 |
| JP | 2006-126890 A | 5/2006 |
| JP | 2006-330124 A | 12/2006 |
| JP | 2007-102459 A | 4/2007 |
| JP | 2011-108102 A | 6/2011 |
| JP | 2011-204097 A | 10/2011 |
| JP | 2012-160013 A | 3/2012 |
| JP | 2012-118746 A | 6/2012 |

\* cited by examiner

| Source URL | Source Type | Usage count | Intermediate format | Cache Path | Identifier |
|---|---|---|---|---|---|
| http://.../abc.html | HTML Document | 3 | N/A | ./abc.html | fda7 |
| http://.../def.js | Javascript | 5 | Available | ./def.001 | fc0c |
| http://.../ghi.css | CSS | 2 | N/A | ./ghi.css | 67d1 |
| http://.../jkl.jpg | JPG Image | 6 | Available | ./jkl.002 | 98a1 |

INFORMATION PROCESSING DEVICE AND RECORDING MEDIUM

TECHNICAL FIELD

The present disclosure relates to information processing devices and recording media.

BACKGROUND ART

Nowadays, systems in which a server provides content in response to a request from a client have been widespread, such as the World Wide Web (WWW) that provides documents of Hypertext Markup Language (HTML). With regard to such systems, shortening of time necessary to provide content for a client (specifically, shortening of time between transmission of a request from the client and output of content in the client) is a long-standing problem. For example, Patent Literature 1 describes a technology of caching content in a web server in order to efficiently use caches even if access to web services or memory resources is limited.

CITATION LIST

Patent Literature

Patent Literature 1: JP 2011-108102A

SUMMARY OF INVENTION

Technical Problem

However, in recent years, rich documents that refer to various resources have been increasing such as scripts and images/videos in the HTML, and the above described speed-up technique has been desired to be further improved. Improvement of processing power of a server or a client also contributes to speeding up. However, the processing power is not always easily improved in the case where the client is a mobile device or a wearable device, for example.

Accordingly, the present disclosure proposes a novel and improved information processing device and recording medium that are capable of optimizing a content output process by caching a source of content in an appropriate format.

Solution to Problem

According to the present disclosure, there is provided an information processing device including: a source acquisition unit configured to acquire a source of content; and a content output unit configured to output the content on the basis of the acquired source. The source includes a source cached by a client, and the cached source includes a source converted into an intermediate format.

According to the present disclosure, there is provided a recording medium having a program stored therein, the program causing a computer to achieve: a function of acquiring a source of content; and a function of outputting the content on the basis of the acquired source. The source includes a source cached by a client, and the cached source includes a source converted into an intermediate format.

Advantageous Effects of Invention

As described above, according to the present disclosure, it is possible to optimize the content output process by caching a source of content in an appropriate format.

Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description is given in the following order.
1. System Configuration
2. Functional Configuration of Terminal Device
3. Workflow of Process
4. Example of Stored Information
5. Example of Data Exchange
6. Modification
7. Hardware Configuration
8. Supplement (1. System Configuration)

Figure 1:
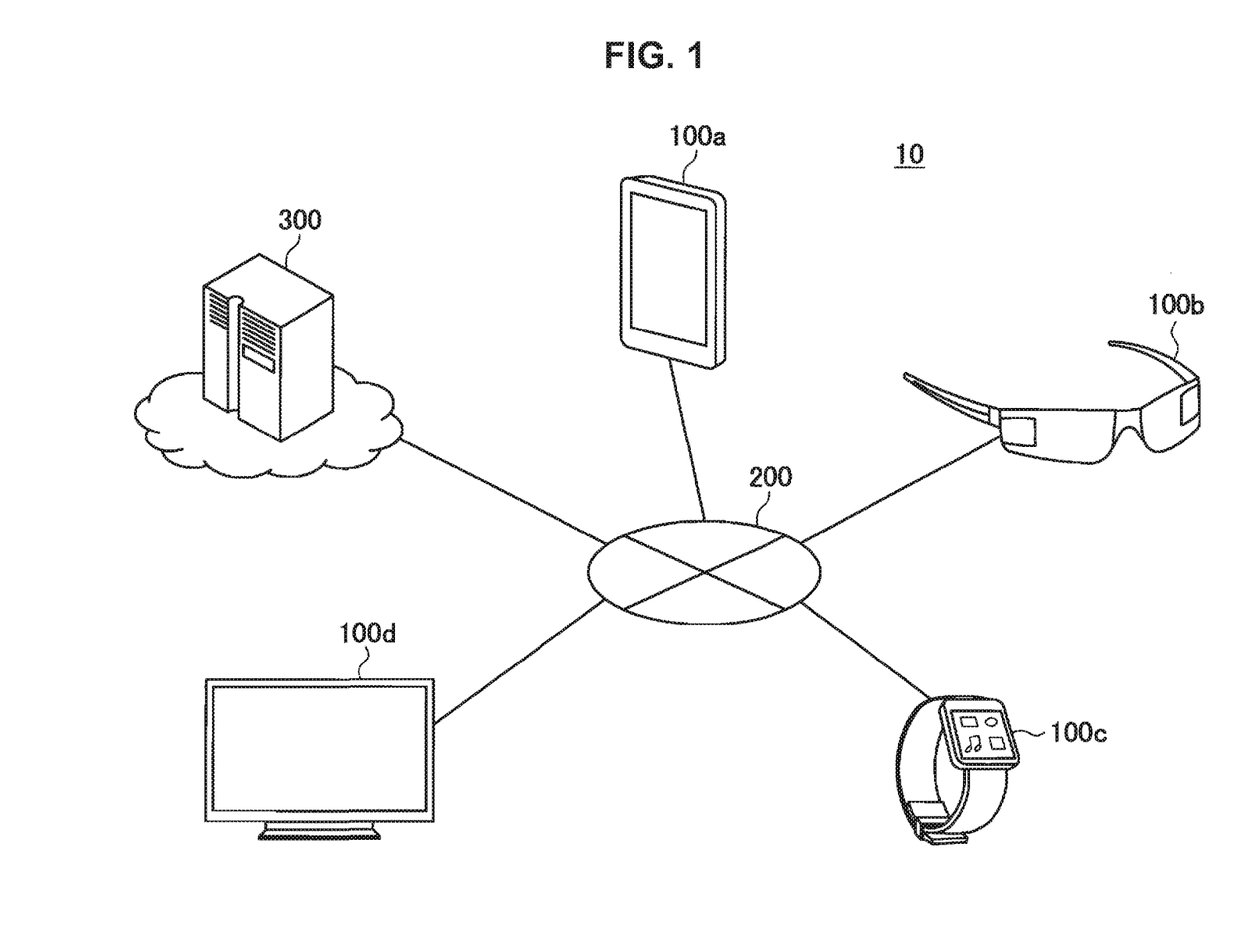
FIG. 1 is a diagram illustrating an example of a system according to an embodiment of the present disclosure.

FIG. 1 is a diagram illustrating an example of a system according to an embodiment of the present disclosure. With reference to FIG. 1, a system 10 includes terminal devices 100 and a server 300.

The terminal devices 100 may be various devices that output content to users. For example, the terminal devices 100 may be mobile devices such as a smartphone 100a and a tablet, or may by wearable devices such as eyewear 100b and a smartwatch 100c. Alternatively, the terminal devices 100 may be another consumer electronics (CE) apparatus such as a personal computer and a television 100d.

The server 300 provides various services for users via the terminal devices 100. For example, the server 300 includes one or a plurality of server devices that provide various server functions, such as a web server, a file server, a database server, and an application server. For example, each of the terminal devices 100 and the server devices constituting the server 300 may be implemented by a hardware configuration of an information processing device described later.

The terminal device 100 and the server 300 are connected via a network 200. In the case where the system 10 includes a plurality of terminal devices 100, the terminal devices 100 are connected to each other via the network 200. The network 200 may be a wired or wireless network such as the Internet or a home LAN.

(2. Functional Configuration of Terminal Device)

Figure 2:
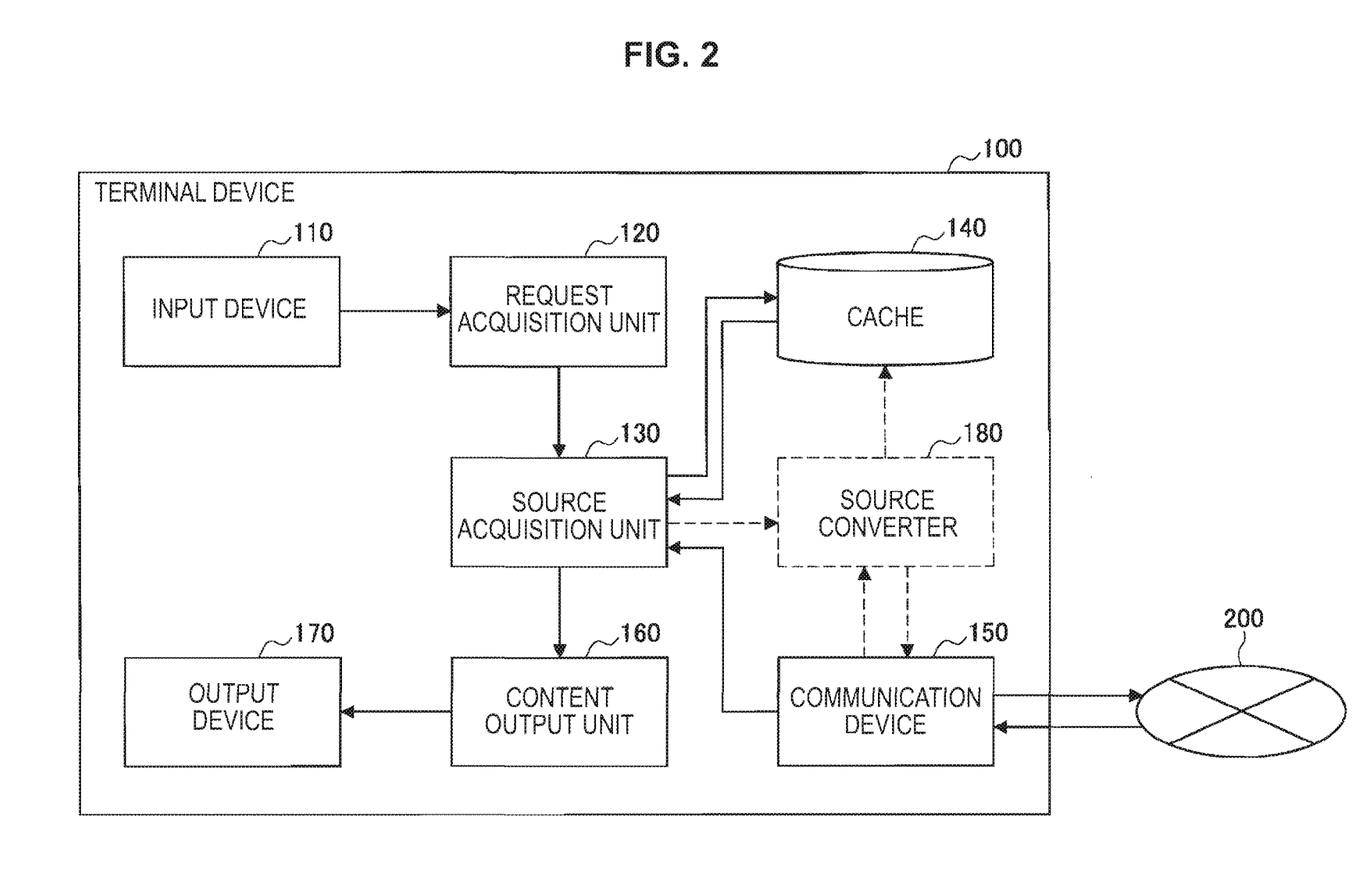
FIG. 2 is a block diagram illustrating a functional configuration example of a terminal device according to an embodiment of the present disclosure.

FIG. 2 is a block diagram illustrating a functional configuration example of a terminal device according to an embodiment of the present disclosure. With reference to FIG. 2, the terminal device 100 includes an input device 110, a request acquisition unit 120, a source acquisition unit 130, a cache 140, a communication device 150, a content output unit 160, and an output device 170 and a source converter 180. Note that, functions of the request acquisition unit 120, the resource acquisition unit 130, the content output unit 160, and the source converter 180 may be implemented by a processor operating according to a program, such as a CPU in the terminal device 100.

The input device 110 is a device that acquires user operation input to the terminal device 100. The input device 110 may be implemented by a device for input such as a touchscreen, a hardware button, a keyboard, or a mouse. Alternatively, the input device 110 may be implemented by a device that captures input provided as sound or gesture from a user, such as a microphone or a camera. Alternatively, the input device 110 may be implemented by a device (including a wired connection port) that receives operation signals from an external device that functions as a remote control. The input acquired by the input device 110 are provided via a graphical user interface (GUI), a natural user interface (NUI), or a command line interface (CLI), for example.

The request acquisition unit 120 acquires a content output request from the input device 110. The request acquisition unit 120 extracts a request from various kinds of operation input acquired by the input device 110. The user requests output of specific content by selecting an icon displayed via the input device 110, or inputting a Uniform Resource Locator (URL), for example. The content may be a document such as an HTML document. In this case, the content may include content of image and sound embedded into the document and/or configuration information such as a script and a style sheet used for outputting (displaying) the document. Alternatively, the content may independently provide the image and the sound.

The source acquisition unit 130 acquires a source of the content in response to the request acquired by the request acquisition unit 120. The source is data used for outputting the content. More specifically, the source may include a text file in which the document, script and/or configuration information are described, and a binary file in which the image and the sound are recorded. For example, in the case where the content is output for the first time, the source acquisition unit 130 transmits a request to the server 300 via the communication device 150 and the network 200, and acquires a source that the server 300 has transmitted in response to the request. The source acquisition unit 130 may sometimes acquire a source from the cache 140. The source acquired from the cache 140 (cached source) may be a source that has already been acquired by the server 300 and used for outputting the content.

In addition, the source acquisition unit 130 converts the acquired source into an intermediate format (intermediate form) if necessary, and provides the converted source for the content output unit 160. More specifically, the source acquisition unit 130 decompresses the data of the intermediate format in memory on the basis of the acquired source, the content output unit 160 controls the output device 170 on the basis of the decompressed data, and the content is output. As described later, in this embodiment, at least a part of the source acquired from the cache 140 has already been converted into the intermediate format. Such a source is not converted into the intermediate format by the source acquisition unit 130, and is provided for the content output unit 160 without any change.

Alternatively, an intermediate format into which a source acquired from the cache 140 has already been converted may be different from an intermediate format of a source provided for the content output unit 160. In other words, even in the case where a source acquired from the cache 140 has already been converted into an intermediate format, the source acquisition unit 130 may provide the source for the content output unit 160 after converting the format of the source into another intermediate format. In this case, a process in the source acquisition unit 130 at a time of outputting content can be simplified when the intermediate format of the source acquired from the cache 140 is a format like partially converting the source into the intermediate format of the source provided for the content output unit 160.

The content output unit 160 outputs the content on the basis of the source provided by the source acquisition unit 130. As described above, more specifically, the content output unit 160 outputs the content by controlling the output device 170 on the basis of the data of the intermediate format decompressed in the memory by the source acquisition unit 130.

The output device 170 is a device that output various kinds of information from the terminal device 100 to the user. The output device 170 may be implemented by a device for output such as a display, a light guiding member, a speaker, or headphones. Alternatively, the output device 170 may be implemented by a device (including a wired connection port) that transmits data to the external device including such a device for output. For example, the output device 170 outputs images, sound, light emission patterns, or vibration. The content is output as the image or the sound for example. In addition, the image or the sound may be combined with the vibration.

The cache 140 is implemented by memory or a storage included in the terminal device 100 for example, and stores sources of content. As described above, the sources stored in the cache 140 may be sources that have already been acquired from the server 300 via the communication device 150 and the network 200 and used for outputting the content. In addition, some of the sources stored in the cache 140 have been converted into the intermediate format. In this specification, the sources stored in the cache 140 may also be referred to as cached sources.

The intermediate format (intermediate form) means a format of data intermediately formed when image data or sound data to be output is generated from a source of content. Through a predetermined procedure, the source is converted from a format (hereinafter, also referred to as original format) at a time of being acquired from the server 300 via the communication device 150, into the intermediate format, before the content output unit 160 uses the source to output the content. Next, examples of the intermediate format of various kinds of content and processes to converts such an intermediate format will be described.

For example, in the case where the original format of a source is a document using HTML, XML, or the like, the intermediate format is a data structure obtained by parsing the document according to the Document Object Model (DOM). In general, the document is parsed at a time of output. However, it is also possible to generate the data structure by parsing in advance, and store the data structure as a source in the cache 140.

For example, in the case where the original format of a source is a script such as JavaScript, the intermediate format is a machine code generated by compiling the script. In general, the script is compiled by a Just-In-Time (JIT) compiler during execution. However, it is also possible to generate the machine code by compiling the script advance, and store the machine code as a source in the cache 140.

For example, in the case where the original format of a source is configuration information such as Cascading Style Sheets (CSS) (more specifically, configuration information having a cascade structure), the intermediate format is configuration information whose cascade structure has been solved. In the configuration information included in the cascade structure, each configuration is overridden. Therefore, in general, the cascade structure of the configuration information is solved when outputting a document, and an actually applied configuration is specified. However, it is also possible to store configuration information whose cascade structure has been previously solved in the cache 140 as a source.

For example, in the case where a source is data of images or sound included in a document, or data of images or sound provided independently, the intermediate format is data obtained by decoding data that have been encoded into a predetermined format. In general, the encoded data of the image or sound is decoded at a time of output. However, it is also possible to store data decoded in advance and converted into RAW data or the like in the cache 140 as a source.

The communication device 150 is a device that establishes communication between the terminal device 100 and the external device via the network 200. The communication device 150 is implemented by a various communication circuit that establishes wireless communication such as Wi-Fi, a mobile network, or Bluetooth (registered trademark), or wired communication such as a local area network (LAN). For example, the communication device 150 communicates with the server 300 via the network 200, transmits a source request from the source acquisition unit 130 to the server 300, and receives a source transmitted from the server 300 in response to the request.

The request to the server 300 and the source are transmitted and received via the communication device 150 in the case where the source acquisition unit 130 has determined that the source necessary to output content is not stored in the cache 140. In this case, in addition to source processes in the source acquisition unit 130 and the content output unit 160, communication with the server 300 via the communication device 150 is necessary to output the content. The cache 140 stores sources that have already been acquired from the server 300 and used for outputting content, and thereby it is possible to reduce processing time and processing load for communication, and reduce time and power to output the content. In addition, in this embodiment, at least some of the sources stored in the cache 140 are converted into the intermediate format, and thereby it is possible to reduce processing time and processing load for converting the source into the intermediate formation at a time of outputting the content, and further reduce time and power to output the content.

However, in the case where the source has been converted into the intermediate format, the size of the source may become larger than the size of its original format since the intermediate format is a format optimized for execution. Therefore, when the number of sources stored in the cache 140 in the intermediate format becomes larger, the number of sources that can be stored in the cache 140 becomes smaller. Accordingly, when the source to be stored in the cache 140 is converted into the intermediate format, it is desirable to set a predetermined condition (for example, condition indicating possibility that source is reused for outputting content), convert sources satisfying the condition into the intermediate formats, store them in the cache 140, and stores the other sources in the cache 140 in their original formats. In the case where capacity of the memory or storage in the terminal device 100 is sufficiently larger than capacity of the cache 140, it is possible to convert all the sources stored in the cache 140 into the intermediate formats.

Various methods can be used when converting a source stored in the cache 140 into the intermediate format. A first example is a method for storing data of the intermediate format in the cache 140. The data is generated by the source acquisition unit 130 to be provided for the content output unit 160.

A second example is a method for converting a source in an intermediate format by the source converter 180 and storing the source in the cache 140, in addition to the data generated to be provided for the content output unit 160. In the case where the terminal device 100 includes the source converter 180, processing power of the terminal device 100 can be used effectively by carrying out a process to convert the source into the intermediate format in the background, in addition to the process to output the content. In addition, the intermediate format of the source stored in the cache 140 may be different from the intermediate format of the source provided for the content output unit 160. More specifically, for example, in view of the size of the converted source, the cache 140 may store a source of a format like partially converted into the intermediate format used when the source is provided for the content output unit 160.

A third example is a method by which the source converter 180 requests, via the communication device 150, the external device to convert a source into an intermediate format. In the case where the process to convert the source into the intermediate format is carried out in the background as described above, it is possible to complete the process in a shorter time or reduce drain on battery of the terminal device 100 by requesting an external device having sufficient processing power to carry out the process itself, for example.

For example, in the case of the system 10 described with reference to FIG. 1, the wearable device such as the eyewear 100*b* or the smartwatch 100*c* and/or the mobile device such as the smartphone 100*a* whose processing power are not high and whose battery capacity are limited can request the device such as the television 100*d* whose processing power is high and who has enough battery capacity (connected to power source) to carry out the process to convert sources stored in the cache 140 into intermediate formats.

(3. Workflow of Process)

Figure 3:
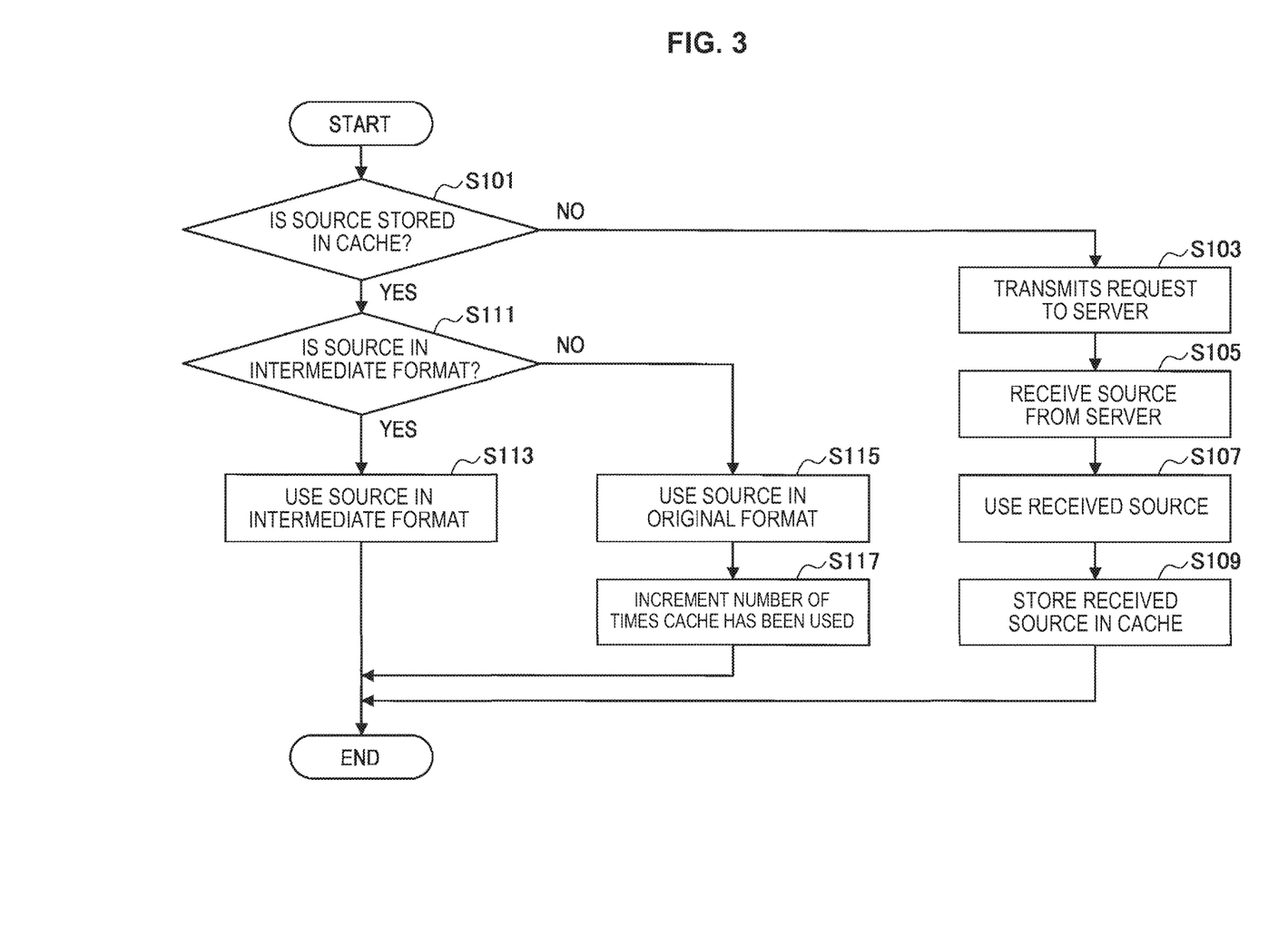
FIG. 3 is a flowchart illustrating an example of a process in a terminal device at a time of outputting content according to an embodiment of the present disclosure.

FIG. 3 is a flowchart illustrating an example of a process in the terminal device at a time of outputting content according to an embodiment of the present disclosure. FIG. 3 illustrates a series of processes executed when the request acquisition unit 120 in the terminal device 100 illustrated in FIG. 2 acquires a content output request. In the processes, first, the source acquisition unit 130 determines whether or not a source necessary to output requested content is stored in the cache 140 (S101). Here, the source may be in the original format or may be a cache in an intermediate format.

In the case where it has been determined that the source is not stored in the cache 140 (NO in S101), the communication device 150 transmits a source request to the server 300 (S103). Next, the communication device 150 receives the source provided by the server 300 in response to the request (S105). The communication device 150 provides the received source for the source acquisition unit 130, and the source acquisition unit 130 and the content output unit 160 output content by using the provided source (S107). After or in parallel with S107, the cache 140 stores the received source (S109). Accordingly, the source in the original format (not intermediate format) is stored in the cache 140.

On the other hand, in the case where it has been determined that the source is stored in the cache 140 (YES in S101), the source acquisition unit 130 further determines whether or not the source stored in the cache 140 is in an intermediate format (S111). In the case where the source is in the intermediate format (YES), the source acquisition unit 130 and the content output unit 160 output content by using the source in the intermediate format acquired from the cache 140 (S113). On the other hand, in the case where it has been determined that the source is not in the intermediate format but in the original format (NO in S111), the source acquisition unit 130 and the content output unit 160 output the content by using the source in the original format acquired from the cache 140 (S115).

Subsequently, in the case where the content has been output using the source in the original format, the source acquisition unit 130 increments the number of times a cache has been used (S117). The cache is stored in the cache 140 in association with the source. In the illustrated example, the number of times the cache has been used is also used in a source format converting process described next, as a condition for determining whether or not the cache 140 stores the source in the intermediate format.

In the process at a time of outputting content as described with reference to FIG. 3, the source is used in the appropriate process depending on whether or not the source necessary to output the content is stored in the cache 140 and depending on whether or not the source stored in the cache 140 has been converted into the intermediate format. Accordingly, the content is output in a shorter processing time and/or at lower processing load.

Figure 4:
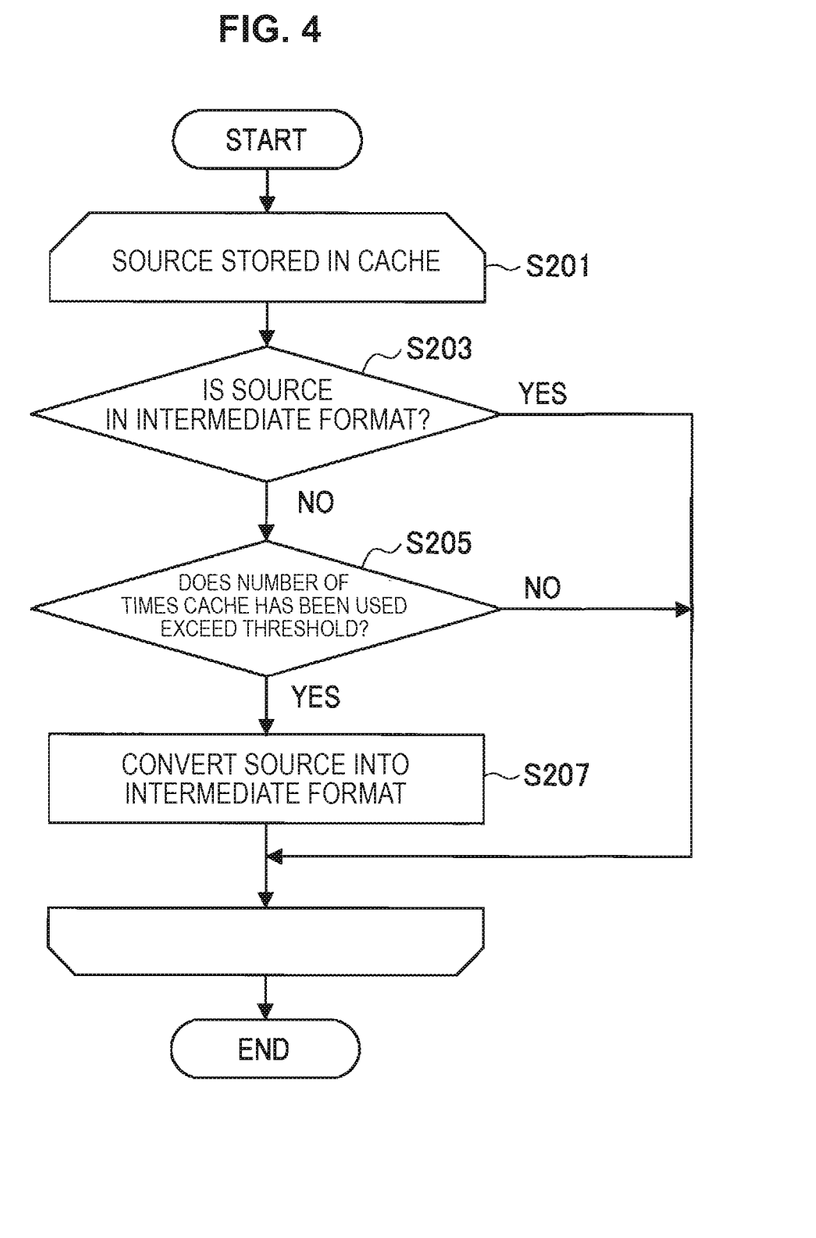
FIG. 4 is a flowchart illustrating an example of a source format converting process in a terminal device according to an embodiment of the present disclosure.

FIG. 4 is a flowchart illustrating an example of the source format converting process in the terminal device according to an embodiment of the present disclosure. FIG. 4 illustrates a series of processes executed in the background in the case where the terminal device 100 illustrated in FIG. 2 has not acquired the request to output content. For example, the processes may be carried out periodically, or may be carried out at a right time when it has been detected that the terminal device 100 (or external device requested to carry out the processes) has enough processing power. Alternatively, the processes may be carried out after or in parallel with content output.

The processes include loop processes for respective sources stored in the cache 140 (S201). The source converter 180 determines whether or not each of the sources in an intermediate format (S203). In the case where the source is in the intermediate format (YES), the process is performed on next source because restoration is not necessary. On the other hand, in the case where the source is not in the intermediate format (NO), the source converter 180 determines whether or not the number of times the cache has been used exceeds a threshold (S205). The cache is stored in the cache 140 in association with the source.

In the case where it has been determined that the number of times the cache has been used has exceeded the threshold (YES in S205), the source converter 180 converts the source into the intermediate format (S207). Subsequently, the source converted into the intermediate format in advance is stored in the cache 140. On the other hand, in the case where it has been determined that the number of times the cache has been used has not exceeded the threshold (NO), the format of the source is not converted. In other words, in this case, the source continues to be stored in the cache 140 in the original format.

According to the source format converting process described with reference to FIG. 4, it is possible to selectively convert sources into intermediate formats with reference to the number of times caches has been used, the sources being estimated to still have a high probability of being used at the time of content output. As described above, the source converted into the intermediate format enables content to be output quickly. However, the source is not necessarily easy to process due to its data size and the like. Therefore, like the above described example, it is desirable to selectively convert sources worth converting into intermediate formats into the intermediate formats.

The criteria for deciding whether or not to convert the source into the intermediate format is not limited to the number of times the cache has been used, and may include various other examples. For example, it is estimated that a source for displaying a web portal (or a home page arbitrarily set by a user) such as an HTML document, a script, configuration information, or an image has a high probability of reuse. Therefore, such a source may be converted into an intermediate format regardless of the number of times the cache has been used. In a similar way, it is estimated that a source of content such as a document, an image, or sound included in a bookmark of a browser or a media player has a high probability of reuse. Therefore, such a source may be converted into an intermediate format regardless of the number of times the cache has been used.

In the example described with reference to FIG. 4, the terminal device 100 includes the source converter 180 and the source format converting process different from the process to output content is carried out. However, as described above, the terminal device 100 does not necessarily include the source converter 180 in the case where the cache 140 has stored data in an intermediate format generated by the source acquisition unit 130 to be provided for the content output unit 160. In this case, the process illustrated in FIG. 4 may be carried out by the source acquisition unit 130. That is, the source acquisition unit 130 carries out the loop process for each source used for outputting content. In the case where the source in the intermediate format has not been stored in the cache 140 yet and the number of times the cache of the source has been used has exceeded a threshold, the cache 140 stores the source in the intermediate format decompressed for outputting content.

In addition, as described above, via the communication device 150, the source converter 180 may request the external device to convert a source instead of or in parallel with converting the format of the source by itself. In this case, the source converter 180 carries out the loop process for each source stored in the cache 140. In the case where the source in the intermediate format has not been stored in the cache 140 yet and the number of times the cache of the source has been used has exceeded a threshold, the source converter 180 requests the external device to convert the source into the intermediate format via the communication device 150. In addition, the source converter 180 replaces the source in the original format stored in the cache 140 with the source in the intermediate format received from the external device.

(4. Example of Stored Information)

Figure 5:
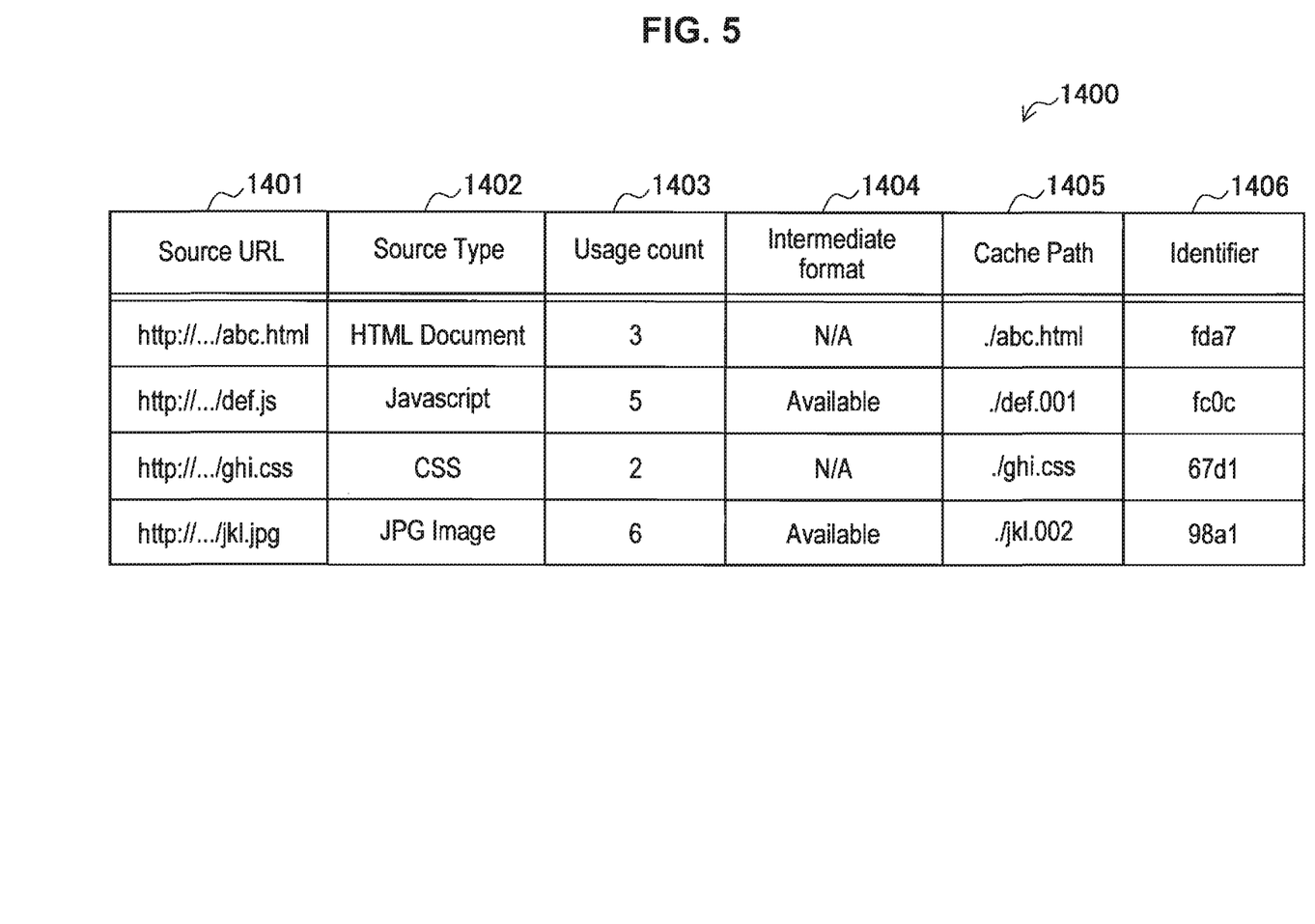
FIG. 5 is a diagram illustrating an example of information stored as caches in an embodiment of the present disclosure.

FIG. 5 is a diagram illustrating an example of information stored as caches in an embodiment of the present disclosure. With reference to FIG. 5, cache management information 1400 includes items of source URL 1401, source type 1402, usage count 1403, intermediate format flag 1404, cache path 1405, and identifier 1406. Hereinafter, information indicated by each item is further described.

The source URL 1401 is a Uniform Resource Locator (URL) designated when acquiring each source from the server, for example. At least when the source URLs 1401 are the same, sources are the same. The source type 1402 indicates a type of each source. In FIG. 5, the HTML document, Javascript, CSS, and JPEG image are illustrated as examples of the type of each source. In addition, there are many types of sources. The usage count 1403 is the number of times of use similar to the number of times the cache has been used that has been described in the example of the process with reference to FIGS. 3 and 4.

The intermediate format flag 1404 indicates whether or not each source stored in the cache 140 is in an intermediate format. In the example of FIG. 5, the source (def.js) of the Javascript and the source (jkl.jpg) of the JPEG image are stored in the intermediate formats (Available). The cache path 1405 indicates a reference path to a data entity of each source. For example, the source acquisition unit 130 refers to the cache path 1405 and read out a source stored in the cache 140. Note that, the method for referring to data entities of sources is not limited to the illustrated example, and various known technologies can be used.

The identifier 1406 is an additional item. The identifier 1406 is an identifier unique to content of each source. For example, a source is considered as binary data regardless of its type and a hash function is applied to generate the identifier 1406. For example, in the case where shared images or sound are used in several different web pages, each source of these images or sound has a different source URL 1401 (because places of servers 300 in which the images or sounds are stored are different). However, even if the source URLs 1401 are different, by using the identifier 1406, the sources having the same content can be treated as the same source.

As described above, sources whose source URLs 1401 are different but whose content are the same are treated as the same source by using the identifiers 1406. Thereby, even when outputting certain content for the first time, a source that has been used for outputting another content and stored in the cache 140 can be reused, and the content can be output quickly by using the cache, for example. In addition, the usage count 1403 is counted for each identifier 1406. This enables determination of whether or not the source having the same content is frequently used regardless of its source URL 1401. In addition, it is possible to appropriately select a source to be stored in the cache 140 in an intermediate format.

MD5, SHA-1, SHA-256, or the like can be used as the hash function for generating the identifier 1406, for example. In a way similar to the source format converting process, the processor of the terminal device 100 may carries out or may request the external device to carry out a process to generate a plurality of identifiers 1406 by using a plurality of hash functions, to determines that sources are the same when all the identifiers are consistent, and to generate an identifier 1406 of one source whose uniqueness may be improved more.

(5. Example of Data Exchange)

Figure 6:
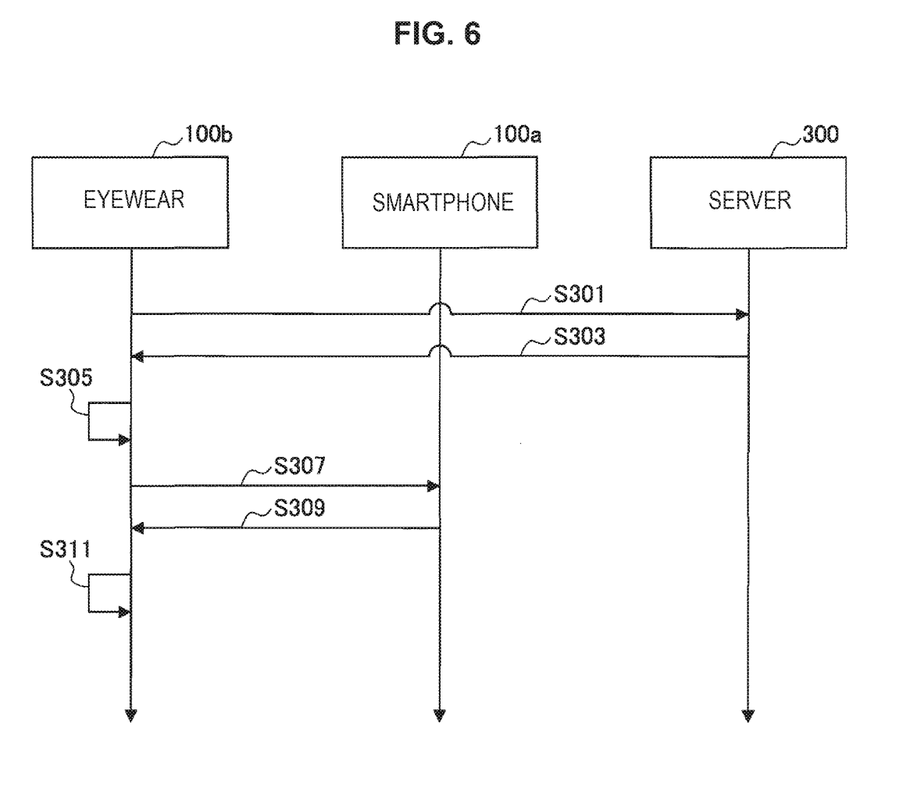
FIG. 6 is a sequence diagram illustrating an example of data exchange between devices in an embodiment of the present disclosure.

FIG. 6 is a sequence diagram illustrating an example of data exchange between the devices in an embodiment of the present disclosure. FIG. 6 illustrates an example in which the eyewear 100b requests a smartphone 100a to carry out a process to convert a source of content into an intermediate format in the system 10 in FIG. 1.

In the illustrated example, the eyewear 100b first receives a document output request from a user and transmits a source request to the server 300 (S301). As described above, the requested source may be a source that is not stored in the cache 140 of the eyewear 100b. Next, the eyewear 100b receives the source transmitted by the server 300 in response to the request (S303).

Next, the eyewear 100b uses the received source and/or a source stored in the cache 140, and outputs content to the user (S305). At this time, the number of times the cache of the source has been used may be incremented by the process described with reference to FIG. 3, for example.

After or in parallel with the output of the content, the eyewear 100b requests the smartphone 100a to carry out a process to convert the source stored in the cache 140 into the intermediate format (S307). Here, for example, by the process described with reference to FIG. 4, the source to be converted into the intermediate format may be decided on the basis of the number of times the cache of the source has been used. The smartphone 100a transmits the source converted into the intermediate format to the eyewear 100b (S309), and the eyewear 100b replaces the source in the original format with the source in the intermediate format (S311).

(6. Modification)

In this modification of the present embodiment, a source of content is not necessarily stored in the cache 140 in the terminal device 100, for example. More specifically, in the case of the eyewear 100b, an entity of a source retained as a cache may be stored in memory or a storage of an external device such as the smartphone 100a, and the cache 140 of the eyewear 100b may stores management information alone that has been described with reference to FIG. 4, for example. In this case, the eyewear 100b acquires the source for outputting the content from the server 300 or from the cache in the smartphone 100a. In a similar way as described above, the cache retained in the smartphone 100a may be converted into the intermediate format according to predetermined conditions.

Therefore, in the embodiment of the present disclosure, the cache of the source is not necessarily stored in the terminal device 100 that outputs content. The cache may be stored in the external device and provided for the terminal device 100 as necessary. Also in this case, when the terminal device 100 communicates with the external device via Wi-Fi or Bluetooth (registered trademark) for example, content can be output in a shorter time than acquiring a source from the server 300 via a network communication. In this specification, the source cached by the terminal device 100 or the external device including such a case is referred to as a "source cached by a client".

(7. Hardware Configuration)

Figure 7:
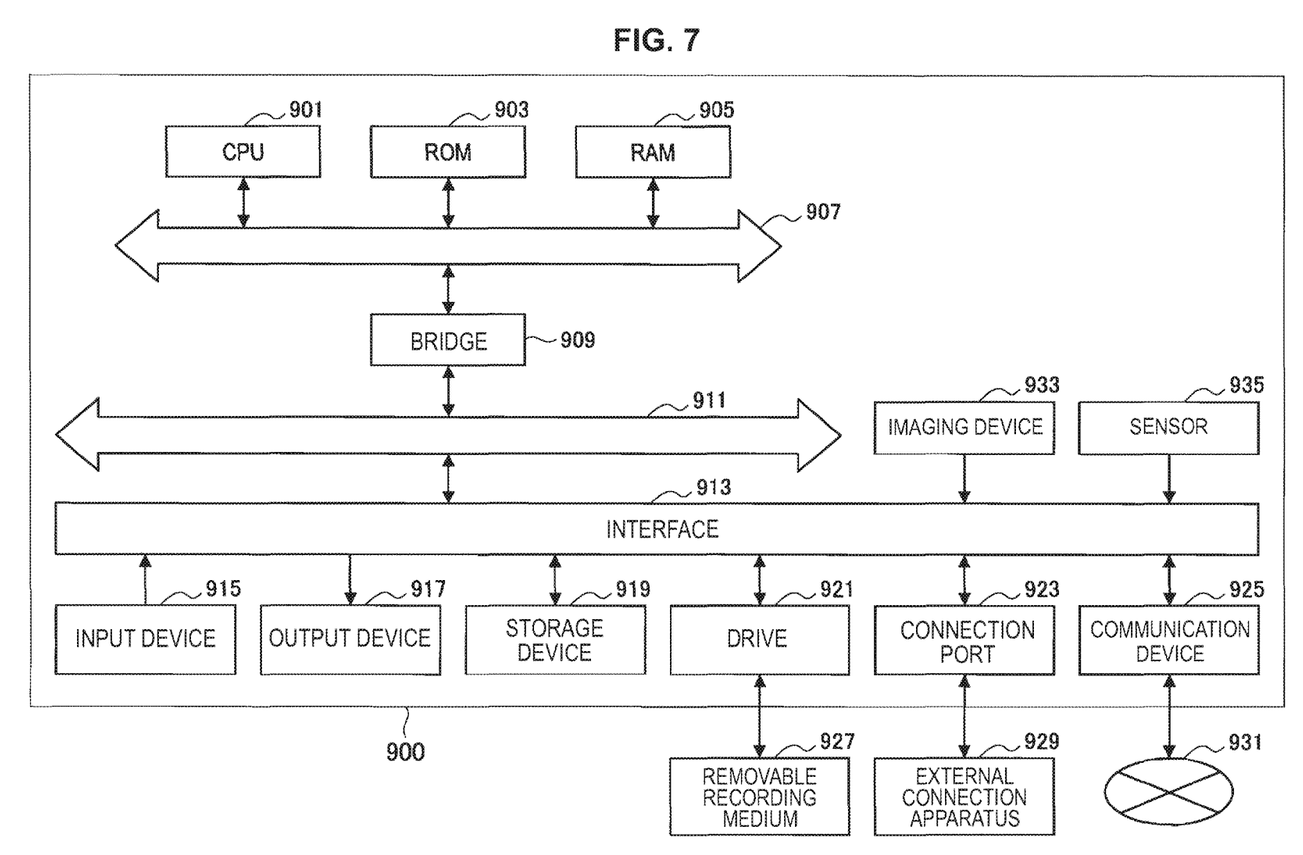
FIG. 7 is a block diagram showing a hardware configuration example of an information processing device according to an embodiment of the present disclosure.

Next, with reference to FIG. 7, a hardware configuration of an information processing device according to an embodiment of the present disclosure is described. FIG. 7 is a block diagram showing a hardware configuration example of an information processing device according to the embodiment of the present disclosure. An illustrated information processing device 900 may achieve the terminal device 100 and/or the server 300 in the above described embodiment.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing device 900 may include a processing circuit such as a digital signal processor (DSP) or an application-specific integrated circuit (ASIC), alternatively or in addition to the CPU 901.

The CPU 901 functions as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may be a remote control device that uses, for example, infrared radiation and another type of radio waves. Alternatively, the input device 915 may be an external connection apparatus 929 such as a mobile phone that corresponds to an operation of the information processing device 900. The input device 915 includes an input control circuit that generates input signals on the basis of information which is input by a user to output the generated input signals to the CPU 901. The user inputs various types of data and indicates a processing operation to the information processing device 900 by operating the input device 915.

The output device 917 includes a device that can visually or audibly report acquired information to a user. The output device 917 may be, for example, a display device such as a liquid crystal display (LCD), a plasma display panel (PDP), and an organic electro-luminescence (EL) display, an audio output device such as a speaker and a headphone, and a printer. The output device 917 outputs a result obtained through a process performed by the information processing device 900, in the form of text or video such as an image, or sounds such as voice and audio sounds.

The storage device 919 is a device for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage unit 919 stores therein the programs and various data executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. The drive 921 writes the record into the mounted removable recording medium 927.

The connection port 923 is a port used to directly connect apparatuses to the information processing device 900. The connection port 923 may be a Universal Serial Bus (USB) port, an IEEE1394 port, or a Small Computer System Interface (SCSI) port, for example. The connection port 923 may also be an RS-232C port, an optical audio terminal, a High-Definition Multimedia Interface (HDMI (registered trademark)) port, and so on. The connection of the external connection device 929 to the connection port 923 makes it possible to exchange various kinds of data between the information processing device 900 and the external connection device 929.

The communication device 925 is a communication interface including, for example, a communication device for connection to a communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio wave communication, or satellite communication.

The imaging device 933 is a device that shoots a real space by using an image sensor such as a charge coupled device (CCD) and a complementary metal oxide semiconductor (CMOS), and various members such as a lens for controlling image formation of a subject image onto the image sensor, and generates the shot image. The imaging device 933 may shoot a still image or a moving image.

The sensor 935 is various sensors such as an acceleration sensor, a gyro sensor, a geomagnetic sensor, an optical sensor, and a sound sensor. The sensor 935 acquires information regarding a state of the information processing device 900 itself such as a posture of a housing of the information processing device 900, and information regarding an environment surrounding the information processing device 900 such as luminous intensity and noise around the information processing device 900. The sensor 935 may include a global positioning system (GPS) sensor that receives GPS signals to measure latitude, longitude, and altitude of the device.

The example of the hardware configuration of the information processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

(8. Supplement)

The embodiments of the present disclosure may include, for example, the above-described information processing device, the above-described system, an information processing method executed by the information processing device or the system, a program for causing the information processing device to exhibits its function, and a non-transitory tangible medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:
a source acquisition unit configured to acquire a source of content; and
a content output unit configured to output the content on the basis of the acquired source,
wherein the source includes a source cached by a client, and
the cached source includes a source converted into an intermediate format.

(2)

The information processing device according to (1),
wherein the cached source includes a source that has not been converted into an intermediate format, and
the information processing device further includes a source converter configured to convert the source that has not been converted into an intermediate format, into the intermediate format.

(3)

The information processing device according to (2),
wherein the source converter converts the source that has not been converted into the intermediate format, into the intermediate format, on the basis of the number of times the source that has not been converted into the intermediate format has been used as output of the content.

(4)

The information processing device according to (3), further including
a communication unit configured to communicate with an external device,
wherein, via the communication unit, the source converter requests the external device to carry out a process to convert the source that has not been converted into the intermediate format into the intermediate format.

(5)

The information processing device according to any one of (1) to (4),
wherein the source acquisition unit determines whether or not the source has been cached by the client, on the basis of an identifier unique to each content of the source.

(6)

The information processing device according to any one of (1) to (5),
wherein the source includes a document, and
the source converted into the intermediate format includes a data structure obtained by parsing the document.

(7)

The information processing device according to any one of (1) to (6),
wherein the source includes a script, and
the source converted into the intermediate format includes a machine code obtained by compiling the script.

(8)

The information processing device according to any one of (1) to (7),
wherein the source includes configuration information having a cascade structure, and
the source converted into the intermediate format includes configuration information whose cascade structure has been solved.

(9)

The information processing device according to any one of (1) to (8),
wherein the content includes image data or sound data each of which has been encoded, and
the source converted into the intermediate format includes the image data or the sound data each of which has been decoded.

(10)

A recording medium having a program stored therein, the program causing a computer to achieve:
a function of acquiring a source of content; and
a function of outputting the content on the basis of the acquired source,
wherein the source includes a source cached by a client, and
the cached source includes a source converted into an intermediate format.

REFERENCE SIGNS LIST 10 system
100 terminal device
110 input device
120 request acquisition unit
130 source acquisition unit
140 cache
150 communication device
160 content output unit
170 output device
180 source converter
200 network
300 server

The invention claimed is:

1. An information processing device for a user to access services from a content server, the information processing device comprising:
circuitry including at least a processor and a memory, the circuitry configured to:
receive an input from the user via a user interface, the input corresponding to the user's request to acquire a source of content;
check whether or not the source is stored in cache of the information processing device;
when the source is stored in the cache, check whether the stored source is in (i) an original format or (ii) an intermediate format including at least decoded image or sound data;
when the stored source is in the original format, check a number of times that the stored source is used as an output of the stored source of content without being converted to the intermediate format;

when the number exceeds a threshold, cause a conversion of the original format of the stored source to the intermediate format to replace the original format; and output the stored source of content to an output interface of the information processing device for the user.

2. The information processing device according to claim 1, wherein the source stored in the cache includes a source that has not been converted into an intermediate format, the circuitry is further configured to cause a conversion of the source that has not been converted into the intermediate format, into the intermediate format.

3. The information processing device according to claim 2, wherein the circuitry converts the source that has not been converted into the intermediate format, into the intermediate format, based on the number of times the source that has not been converted into the intermediate format has been used as output of the content.

4. The information processing device according to claim 2, wherein the circuitry is further configured to requests an external device to carry out a process to convert the source that has not been converted into the intermediate format into the intermediate format.

5. The information processing device according to claim 1, wherein the circuitry is further configured to determine whether or not the source has been cached by a client based on an identifier unique to each content of the source.

6. The information processing device according to claim 1, wherein the source includes a document, and
the source converted into the intermediate format includes a data structure obtained by parsing the document.

7. The information processing device according to claim 1, wherein the source includes a script, and
the source converted into the intermediate format includes a machine code obtained by compiling the script.

8. The information processing device according to claim 1, wherein the source includes configuration information having a cascade structure, and
the source converted into the intermediate format includes configuration information whose cascade structure has been solved.

9. The information processing device according to claim 1, wherein the content includes image data or sound data each of which has been encoded, and
the source converted into the intermediate format includes the image data or the sound data each of which has been decoded.

10. A non-transitory computer readable medium storing computer readable instructions thereon that, when executed by a computer, causes the computer to perform a method comprising:

receiving an input from the user via a user interface, the input corresponding to the user's request to acquire a source of content;

checking whether or not the source is stored in cache of the information processing device;

when the source is stored in the cache, checking whether the stored source is in (i) an original format or (ii) an intermediate format including at least decoded image or sound data;

when the stored source is in the original format, checking a number of times that the stored source is used as an output of the stored source of content without being converted to the intermediate format;

when the number exceeds a threshold, causing a conversion of the original format of the stored source to the intermediate format to replace the original format; and outputting the stored source of content to an output interface of the information processing device for the user.

* * * * *